(No Model.)
2 Sheets—Sheet 1.
O. O. STORLE.
HARVESTER ELEVATOR.
No. 528,745. Patented Nov. 6, 1894.
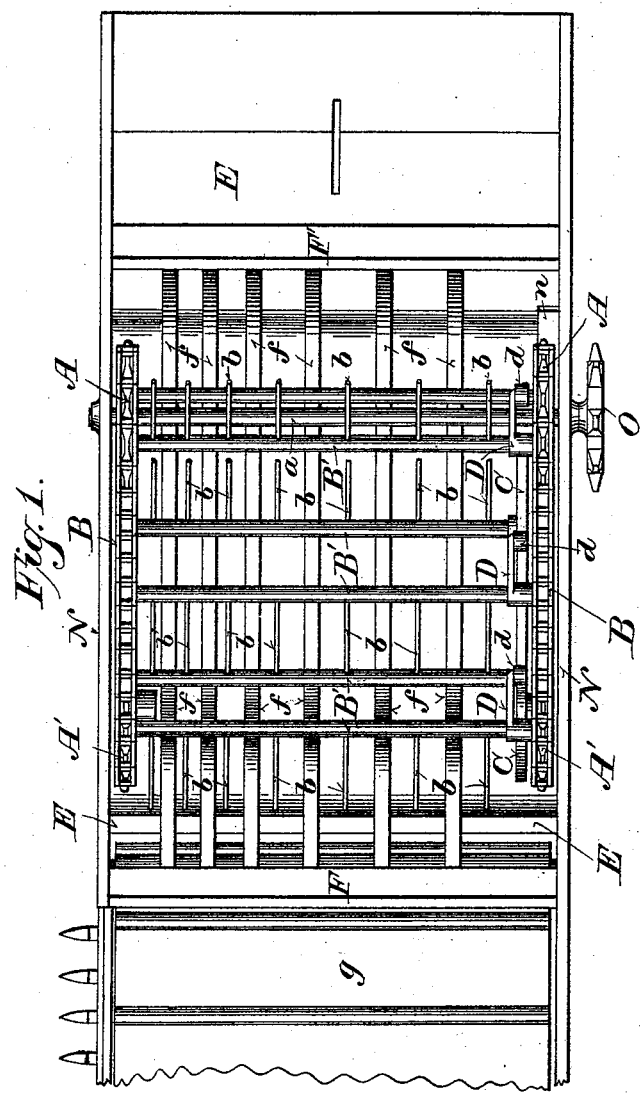

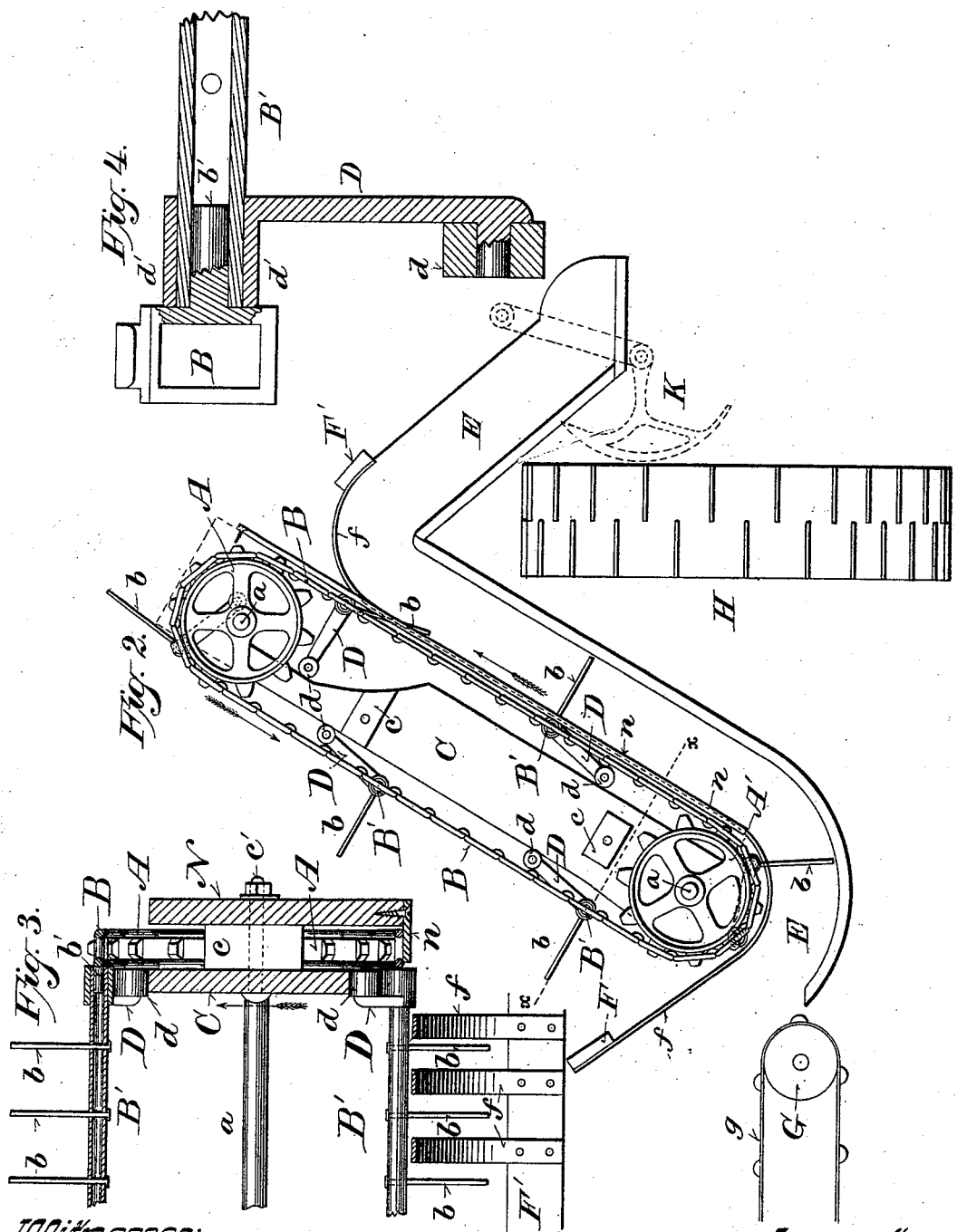

UNITED STATES PATENT OFFICE.

OLE O. STORLE, OF MILWAUKEE, WISCONSIN.

HARVESTER-ELEVATOR.

SPECIFICATION forming part of Letters Patent No. 528,745, dated November 6, 1894.

Application filed April 27, 1885. Serial No. 163,527. (No model.)

*To all whom it may concern:*

Be it known that I, OLE O. STORLE, of Milwaukee, in the county of Milwaukee and State of Wisconsin, have invented certain new and useful Improvements in Harvester-Elevators; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to that class of mechanism employed in harvesting machines for elevating grain from the conveyer upon which it falls as it is cut, to the binder.

It consists of certain peculiarities in the construction and arrangement of the component parts of the elevator as hereinafter particularly described and pointed out in the claims.

The objects of my invention are, first, to reduce the friction of this class of mechanism to the minimum; second, to relieve the belts or chains of strain, and, third, to support the rake teeth throughout their circuit in their proper position independently of the carrying belts or chains.

In the accompanying drawings like letters designate similar parts in the several figures.

Figure 1 is a top or plan view of my improved elevator and the parts immediately associated therewith. Fig. 2 is a side elevation of the same. Fig. 3 is an enlarged sectional view on the line $x$ $x$, Fig. 2, showing one of the upper sprocket wheels and adjacent parts of the elevator, and Fig. 4 is a detail view on a greatly enlarged scale of one of the cranks and its connections, controlling the position of the rakes.

E is the elevator trough or chute, and N N, the frame in which is journaled near the upper end transverse shaft $a$, on which are mounted sprocket wheels A A. Similar sprocket wheels A' A' are secured in line with said sprocket wheels A A to the frame N N near its lower end.

B B are chain belts mounted upon said sprocket wheels A A' and supporting and carrying at intervals the transverse rake-heads B' B'. These rake-heads B' B' are formed of tubular iron or gas-pipe, pivoted at the ends upon projections or journals $b'$ $b'$ formed upon some of the links of said chain belts B B. To one end of each of said rake-heads B' B' is secured a crank D by means of a collar $d'$ formed at one end thereof and encircling the end of said rake-head B'. The other ends of said cranks D D are provided with right-angled bearings upon which are mounted small friction rollers $d$ $d$.

$b$ $b$ are fingers or teeth secured at right-angles and at suitable intervals in or to rake-heads B' B'.

C is a guide attached to the inner side of frame N by means of bolts $c'$ $c'$ passing through the blocks $c$ $c$ inserted between said frame N and guide C to hold the latter in the proper position to be traversed by the rollers $d$ $d$ mounted upon the crank arms D D. The lower end of the guide C is enlarged so as to cause the rake teeth $b$ $b$ to enter the lower curved end of the chute E at right-angles, or nearly so, to the chains B B and said chute E, and is so formed along the lower portion of its under edge as to maintain said teeth $b$ $b$ in the same position relatively to said chains B B and chute E while they traverse the ascending incline of said chute above its curved lower end. It is also cut away along the upper portion of its under edge so as to permit said teeth $b$ $b$ to drop back and withdraw from said chute at its upper end in a position nearly parallel with the chains B B at that point, as seen in Fig. 2.

$f$ $f$ are guards, formed of band-iron or any other suitable material, attached at the top and bottom to transverse bars F' F, and curved to correspond with the contour of chute E in which they serve to guide the grain while it is elevated therein to the binder by the rake-teeth $b$ $b$, and to clear the latter when they drop back and are withdrawn from the chute E at its upper end or curve. These guards and also the rake-teeth $b$ $b$ are placed nearer together toward the front of the machine in order to sustain the butts of the grain and shorter grass and weeds usually growing with it.

$n$ $n$ are inwardly projecting guides secured to the frame N N so as to sustain the lower segments of the chains B B and prevent the rake-teeth b b from coming in contact with the bottom of the chute E.

H, Fig. 2, represents the main driving wheel of the harvester; g, a portion of the apron or canvas conveyer, which conducts the grain as it is cut into the lower or receiving end of chute E, and G one of the rollers over which said apron turns. The position of the binder needle and frame, applied to the discharging end of chute E, is shown by dotted lines at K. The elevator is driven by means of the sprocket wheel O mounted upon the end of shaft a and connected with any convenient part of the harvester.

The operation of my improved machine may be briefly described as follows: The grain as it is cut is carried by the conveyer g to and deposited upon the lower curved end of chute E where it is caught by the rake-teeth b b, which carry it up to the upper end of said chute and feed it to the binder. The teeth b b, controlled by the crank arms D D, traversing by means of their terminal rollers d d the guide C, enter chute E, at right-angles or nearly so thereto and to the chain belts B B, in which position they are held by said crank arms D D and guide C until they approach the upper turn of said chute when rollers d d at the ends of the crank arms, following the receding edge of guide C, permit the rake-teeth b b to fall back loosely in line with said chains B B and to be freely withdrawn from the grain in said chute. As the rake-heads B' pass over the upper sprocket wheels A A, the crank arms D D strike against and turn about shaft a from which they pass upon guide C, bringing the rake-teeth b b, in which position they are supported throughout their circuit until they again reach the upper turn of chute E and are withdrawn therefrom as before described.

The details of the mechanism for carrying out my invention may be variously modified without departing from the principle thereof.

Having thus described my invention, what I claim as new, and desire to secure by Letters Patent, is—

1. The combination in an elevator for harvesting machines of an inclined, ascending chute, turned in opposite directions at its lower and upper ends to receive and discharge the grain, sprocket wheels carrying chain belts, rakes hinged to said chain belts transversely to said chute and provided with crank arms, and a guide traversed by said crank arms and formed with an enlargement at the lower end and a depression at the upper end which cause the rake teeth to enter said chute at the proper angle thereto and allow them to drop back toward said chain belts and to be withdrawn lengthwise from the upper turn in said chute, substantially as and for the purposes set forth.

2. The combination in a harvester elevator of an upwardly inclined chute turned in opposite directions at the ends to receive and discharge the grain and comprising a platform and guards located above and parallel with said platform, chain belts supported and driven above and parallel with said chute by suitable wheels, rakes hinged to said belts transversely thereto and having teeth arranged to project between said guards into said chute as the rakes ascend, cranks on the rake heads, a guide arranged to be traversed by said cranks, and having an enlargement at its lower end and a depression at its upper end, whereby the rake teeth are caused to enter and withdraw from the chute in the proper direction and guide ways arranged to support the rakes in their ascent and to prevent sagging of the chain belts, substantially as and for the purposes set forth.

In testimony that I claim the foregoing as my own I affix my signature in presence of two witnesses.

OLE O. STORLE.

Witnesses:
CHAS. L. GOSS,
GEORGE GOLL.